(12) United States Patent
Kummerow, II et al.

(10) Patent No.: US 7,833,680 B2
(45) Date of Patent: Nov. 16, 2010

(54) FUEL CELL SEPARATOR PLATE REINFORCEMENT VIA BONDING ASSEMBLY

(75) Inventors: Jack A. C. Kummerow, II, Big Sandy, TN (US); Joseph B. Darke, Dover, TN (US)

(73) Assignee: Dana Automotive Systems Group, LLC, Maumee, OH (US)

(*) Notice: Subject to any disclaimer, the term of this patent is extended or adjusted under 35 U.S.C. 154(b) by 206 days.

(21) Appl. No.: 11/794,992

(22) PCT Filed: Jan. 10, 2006

(86) PCT No.: PCT/IB2006/050093

§ 371 (c)(1),
(2), (4) Date: May 21, 2008

(87) PCT Pub. No.: WO2006/072924

PCT Pub. Date: Jul. 13, 2006

(65) Prior Publication Data

US 2009/0233149 A1    Sep. 17, 2009

Related U.S. Application Data

(60) Provisional application No. 60/642,653, filed on Jan. 10, 2005.

(51) Int. Cl.
*H01M 6/50* (2006.01)
*H01M 10/42* (2006.01)

(52) U.S. Cl. .......... 429/518; 429/452; 429/457

(58) Field of Classification Search .......... 429/26, 429/30, 32, 34, 35, 36, 41, 44, 192, 200
See application file for complete search history.

(56) References Cited

U.S. PATENT DOCUMENTS

| | | | |
|---|---|---|---|
| 6,372,376 B1 * | 4/2002 | Fronk et al. | 429/41 |
| 6,544,681 B2 * | 4/2003 | McLean et al. | 429/39 |
| 6,815,114 B1 * | 11/2004 | Bronold et al. | 429/35 |
| 2001/0019792 A1 * | 9/2001 | Wozniczka et al. | 429/38 |
| 2001/0049047 A1 * | 12/2001 | Mizuno | 429/36 |

FOREIGN PATENT DOCUMENTS

JP    2002358973 A    12/2002

* cited by examiner

*Primary Examiner* — Jennifer K Michener
*Assistant Examiner* — Eli S Mekhlin
(74) *Attorney, Agent, or Firm* — Marshall & Melhorn, LLC

(57) ABSTRACT

A fuel cell bipolar plate assembly is disclosed which includes a reinforcement positioned between the anode and cathode plates to strengthen the assembly.

3 Claims, 1 Drawing Sheet

FUEL CELL SEPARATOR PLATE REINFORCEMENT VIA BONDING ASSEMBLY

This application claims the benefit of U.S. Provisional Application No. 60/642,653, filed on Jan. 10, 2005, the entirety of which is hereby incorporated by reference.

TECHNICAL FIELD

Fuel cell bipolar plate assemblies, more specifically, reinforced fuel cell bipolar plate assemblies, are disclosed and described.

BACKGROUND ART

A fuel cell is a device that converts the chemical energy of fuels directly to electrical energy and heat. In its simplest form, a fuel cell comprises two electrodes—an anode and a cathode—separated by an electrolyte. During operation, a gas distribution system supplies the anode and the cathode with fuel and oxidizer, respectively. Typically, fuel cells use the oxygen in the air as the oxidizer and hydrogen gas (including hydrogen produced by reforming hydrocarbons) as the fuel. Other viable fuels include reformulated gasoline, methanol, ethanol, and compressed natural gas, among others. For polymer electrolyte membrane ('PEM') fuel cells, each of these fuels must be reformed into hydrogen fuel. However, in direct methanol fuel cells, methanol itself is the fuel. The fuel undergoes oxidation at the anode, producing protons and electrons. The protons diffuse through the electrolyte to the cathode where they combine with oxygen and the electrons to produce water and heat. Because the electrolyte acts as a barrier to electron flow, the electrons travel from the anode to the cathode via an external circuit containing a motor or other electrical load that consumes power generated by the fuel cell.

A complete fuel cell generally includes a pair of separator plates or plate assemblies on either side of the electrolyte. A conductive backing layer may also be provided between each plate and the electrolyte to allow electrons to move freely into and out of the electrode layers. Besides providing mechanical support, the plate assemblies define fluid flow paths within the fuel cell, and collect current generated by oxidation and reduction of the chemical reactants. The plate assemblies are gas-impermeable and have channels or grooves formed on one or both surfaces facing the electrolyte. The channels distribute fluids (gases and liquids) entering and leaving the fuel cell, including fuel, oxidizer, water, and any coolants or heat transfer liquids. Each plate assembly may also have one or more apertures extending through the plate that distribute fuel, oxidizer, water, coolant and any other fluids throughout a series of fuel cells. Each plate assembly is made of an electron conducting material, including graphite, aluminum, other metals, and composite materials such as graphite particles imbedded in a thermosetting or thermoplastic polymer matrix. To increase their energy delivery capability, fuel cells are typically provided in a stacked arrangement of pairs of separator plates or plate assemblies with electrolyte between each plate pair or plate assembly pair. In this arrangement, one side of the plate assembly will be positioned adjacent to and interface with the anode of one fuel cell while the other side of the plate assembly will be positioned adjacent to and interface with the cathode of another fuel cell. Thus, the separator plate assemblies are referred to as 'bipolar.'

Typical bipolar plate assemblies include an anode plate and a cathode plate bonded together using a conductive adhesive. As indicated above, coolant channels are typically formed by the assembly process, due to grooves on one plate mating with a flat surface or matching grooves on the other plate. As bipolar plate assemblies are driven to be thinner (<1 mm), the strength of the plate decreases. The apertures mentioned above define manifold holes for supply of reactants and product removal. These areas are particularly vulnerable to cracks. Thus, there is a need for a stronger bipolar plate assembly without significantly increasing the thickness of the assembly.

SUMMARY OF THE EMBODIMENTS

A fuel cell bipolar plate assembly comprises an anode plate, a cathode plate, and a sheet of reinforcing material positioned therebetween and having an adhesive associated with said sheet of reinforcing material to secure the sheet of reinforcing material to the anode and cathode plates. In one embodiment, the reinforcing material is a carbon fiber cloth. In another embodiment, the reinforcing material is pre-impregnated with adhesive. In further embodiments, the reinforcing material is coated with adhesive. In still other embodiments, the anode and cathode plates each have one surface coated with the adhesive.

A fuel cell bipolar plate assembly comprises an anode plate, a cathode plate, and a sheet of reinforcing material positioned therebetween. The sheet of reinforcement material surrounds manifold areas of the anode and cathode plates and leaves uncovered an active area of at least one selected from the anode plate and the cathode plate. The sheet of reinforcement material has an adhesive to secure the sheet of reinforcing material to the anode and cathode plates. In one embodiment, the reinforcing material frames the active area. In a further embodiment, the reinforcement material is paper. In yet another embodiment, the reinforcement material is fiberglass.

A method of making a fuel cell assembly comprises providing an anode plate, providing a cathode plate, and securing a sheet of reinforcement material between the anode plate and the cathode plate. In an embodiment, the reinforcement material has a first surface facing the anode plate, a second surface facing the cathode plate, and the method further comprises applying an adhesive to at least one of the first and second surfaces. In other embodiments, the anode plate has a first surface facing the cathode plate, the cathode plate has a second surface facing the anode plate, and the method further comprises applying an adhesive to at least one of the first and second surfaces. In still other embodiments, the method further comprises curing the adhesive.

A fuel cell assembly comprises an anode plate having at least one opening, a first surface, and a second surface, at least the first surface having a plurality of grooves. The assembly further comprises a cathode plate having at least one opening, a first surface, and a second surface, at least the first surface having a plurality of grooves. A carbon cloth reinforcement material is disposed between the second surface of the anode plate and the second surface of the cathode plate. The reinforcement material has at least one opening. The reinforcement material is adhesively bonded to at least one of the second surface of the anode plate and the second surface of the cathode plate, and the anode plate at least one opening is generally aligned with the cathode plate at least one opening and the carbon fiber cloth at least one opening.

DETAILED DESCRIPTION

Figure 1:
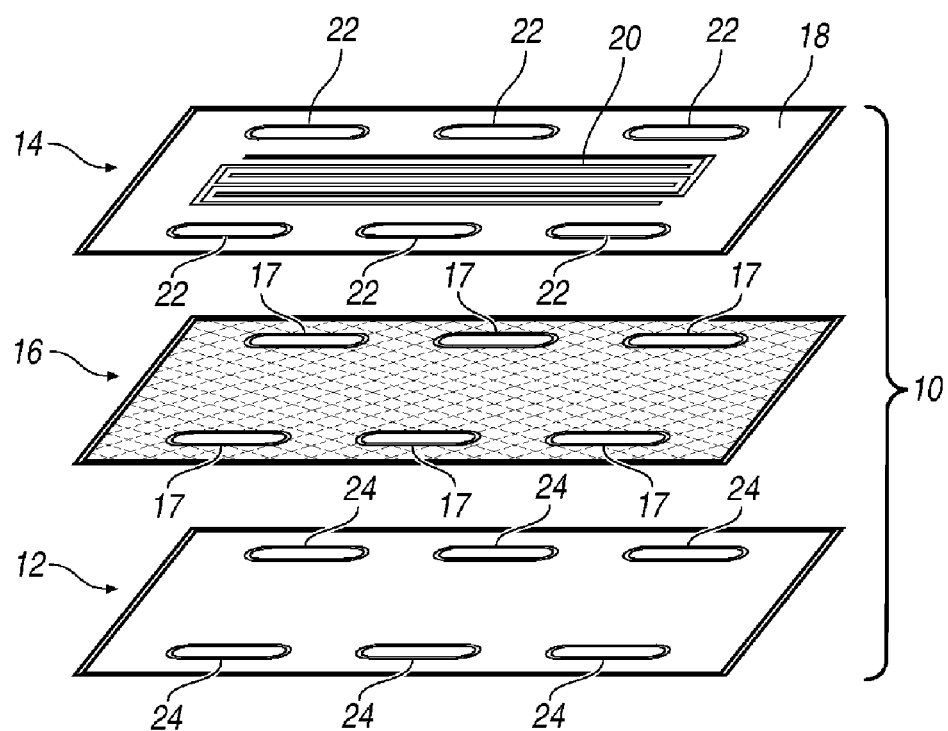
FIG. 1 is a schematic representation of a first embodiment of a bipolar fuel cell separator plate assembly.

Referring to FIG. 1, an embodiment of a reinforced, bipolar fuel cell separator plate assembly 10 is illustrated. Plate assembly 10 comprises an anode plate 12 and a cathode plate 14. Both anode plate 12 and cathode plate 14 comprise an electron conducting material, such as graphite, aluminum or other metals. Composite materials such as graphite particles imbedded in a thermosetting or thermoplastic polymer matrix are preferred. Graphite particles imbedded in a vinyl ester polymer matrix are especially preferred. When used in a stacked fuel cell arrangement, surface 18 of cathode plate 14 is positioned adjacent a first fuel cell cathode (not shown). Thus, surface 18 may include a structure for distributing gases and liquids entering and leaving the fuel cell (e.g. oxygen entering the fuel cell and water leaving it). To ratably and evenly distribute such materials, the structure preferably comprises channels or grooves 20 provided on surface 18. In addition, cathode plate 14 may include one or more apertures 22 that cooperate with corresponding apertures on other separator plates (such as apertures 24 on anode plate 12, as described below) to define a manifold for distributing fuel, oxidizer, water, coolant and any other fluids throughout a series of fuel cells.

Anode plate 12 may be configured similarly to cathode plate 14. It includes a surface 19 (not shown) which faces away from cathode plate 14. In a stacked fuel cell arrangement, surface 19 is positioned adjacent to the anode of a second fuel cell. Like surface 18 of cathode plate 14, surface 19 may include a structure for distributing gases and liquids entering and leaving the fuel cell (e.g. hydrogen entering the fuel cell) such as channels and grooves. It may also include apertures 24 which cooperate with and are generally aligned with apertures 22 to define a manifold.

In one embodiment, as shown in FIG. 1, a reinforcement 16 is provided between anode plate 12 and cathode plate 14. Reinforcement 16 may be conductive or non-conductive. However, it is preferably conductive or configured to allow conduction between anode plate 12 and cathode plate 14. It is also preferably lightweight. In one exemplary embodiment, reinforcement 16 comprises a sheet of carbon fiber cloth. However, other reinforcing materials such as paper, fiberglass, metal, plastic screens, or plastic frames may also be used. If anode plate 12 and cathode plate 14 include apertures such as 22 and 24, reinforcement 16 is preferably provided with corresponding apertures 17 which are generally aligned with apertures 22 and 24 to provide a flow path through plate assembly 10.

Anode plate 12 and cathode plate 14 are preferably bonded together using a known adhesive. In one exemplary embodiment, each plate is bonded to an adhesive provided on reinforcement 16. Reinforcement 16 may either be pre-impregnated with adhesive or adhesive may be added to it (e.g. by coating) at the time of assembly. Also, the individual separator plates may also be provided with adhesive coated on them. The adhesive is preferably cured at a time and temperature suitable for the adhesive using standard production bonding techniques. In one exemplary embodiment wherein two assemblies are combined in a stacked arrangement, the assemblies are placed in a press at about 315° F. (157.2° C.), at about 16,000 pounds force (71 kN), for approximately three (3) minutes.

Figure 2:
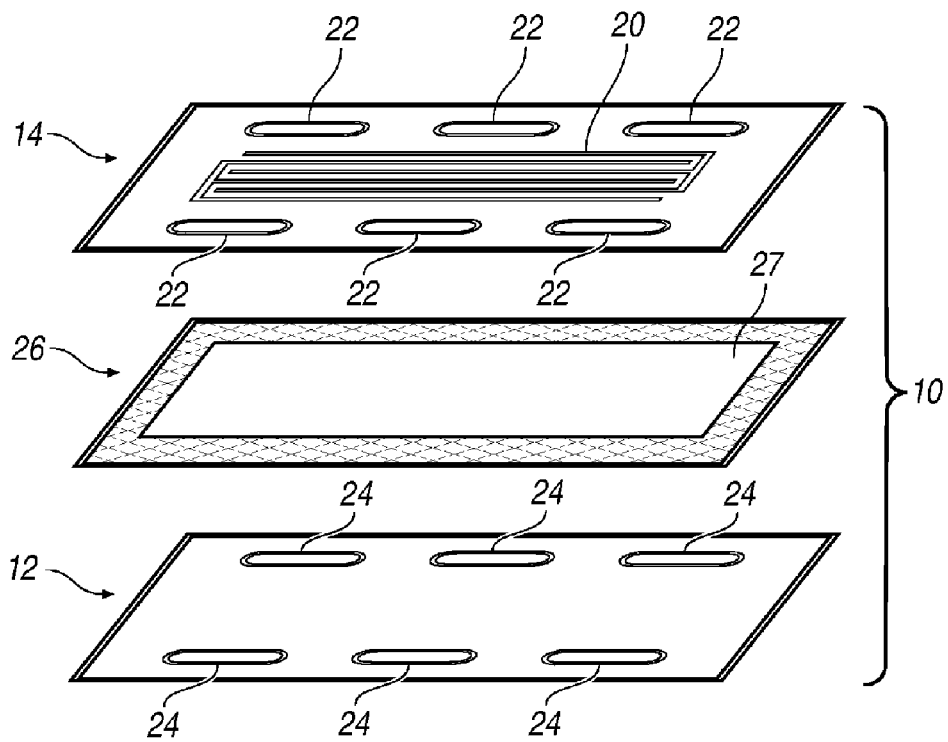
FIG. 2 is a schematic representation of a second embodiment of a bipolar fuel cell separator plate assembly.

A second embodiment of a reinforced separator plate assembly is shown in FIG. 2. In this embodiment, reinforcement 26 comprises a frame or other structure that provides an open area 27. Unlike reinforcement 16 in FIG. 1, reinforcement 26 leaves the active area (i.e., the plate area defined by grooves 20) of anode plate 14 and cathode plate 16 uncovered. If apertures 22 and 24 are provided on anode plate 12 and cathode plate 14, reinforcement 26 is preferably configured so it does not cover the apertures. In an exemplary embodiment, reinforcement 26 includes apertures similar to apertures 17 in reinforcement 16 of FIG. 1. Because the active area is uncovered, reinforcement 26 may be non-conductive because anode plate 12 and cathode plate 14 will remain in electrical contact with one another. In one exemplary embodiment, reinforcement member 26 comprises a paper frame. However, other suitable materials such as carbon fiber cloth, fiberglass, plastic or metal structures may be used. As with the previous embodiment, reinforcement 26 may be pre-impregnated with adhesive or adhesive may be added to it at the time of assembly. Anode plate 12 and cathode plate 14 may also have adhesive coated on them. The adhesive is then cured, preferably using standard production bonding techniques, as described above.

An embodiment of a method of making a fuel cell bipolar assembly will now be described. Referring again to FIG. 1, an anode plate 12 and a cathode plate 14 are provided. Cathode plate 14 has a first surface 18 which preferably includes a plurality of grooves or channels 20 as described above. Cathode plate 14 also preferably includes one or more apertures 22 for defining a manifold. Similarly, anode plate 12 includes surface 19 (not shown) which preferably comprises a plurality of channels and grooves (not shown), as well as one or more apertures 24 for defining a manifold.

In accordance with the method, reinforcement 16 is provided. Reinforcement 16 preferably comprises carbon fiber cloth or the other materials described above. An adhesive is applied to one or both of the surfaces of reinforcement 16 which respectively face anode plate 12 and cathode plate 14. In addition, adhesive may be applied directly to the surfaces of anode plate 12 and cathode plate 14 which face one another. As shown in FIG. 1, reinforcement 16 preferably includes one or more apertures 17 which are generally aligned with cathode plate apertures 22 and anode plate apertures 24 to define a manifold. The adhesive is then preferably cured at a time and temperature suitable for the adhesive using standard bonding techniques. As mentioned above, in one exemplary embodiment wherein two assemblies are combined in a stacked arrangement, the assemblies are placed in a press at 315° F. (157.2° C.), at 16,000 pounds force (71 kN), for approximately three (3) minutes. In addition or in lieu of using adhesive bonding, anode plate 12 and cathode plate 14 may be mechanically fastened to hold reinforcement 16 in place.

The foregoing method can also be used to make assembly 10 of FIG. 2. As indicated in the figure, the plurality of grooves or channels 20 on cathode plate 14 defines an active area on cathode plate 14. Although not separately shown in the figure, anode plate 12 preferably includes a plurality of grooves on surface 19 which also defines an active area on anode plate 12. As explained above, in accordance with this embodiment, reinforcement 26 includes an open area 27 which is positioned so as to generally align with the active area on one or both of anode plate 12 and cathode plate 14. In addition, reinforcement 26 is preferably positioned so not to cover apertures 22 or 24. Like the embodiment of FIG. 1, reinforcement 26 may include its own apertures such as apertures 17 on reinforcement 16. In that case, the reinforcement apertures are preferably generally aligned with anode plate apertures 24 and cathode plate apertures 22 to define a manifold.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

The invention claimed is:

1. A method of making a fuel cell bipolar plate assembly, comprising:
   providing an anode plate;
   providing a cathode plate, said anode plate having a surface facing said cathode plate and a surface facing away from said cathode plate, and wherein said cathode plate has a surface facing said anode plate and a surface facing away from said anode plate; and
   securing a sheet of reinforcement material between said anode plate surface facing said cathode plate and said cathode plate surface facing said anode plate;
   defining at least one of said anode plate and said cathode plate with an active area having a plurality of grooves and an inactive area surrounding said grooves;
   covering only said inactive area with said sheet of reinforcing material and adhering it directly to both plates by an adhesive, said reinforcement plate having a manifold area defined by a plurality of openings in said inactive area in fluid communication with a plurality of aligned openings in said anode plate and cathode plate, said adhesive being located about said openings in said reinforcement plate;
   forming cooling channels by mating said plurality of grooves, in at least one of said anode or cathode plates, with one of said surfaces on either said anode or said cathode plates.

2. The method of claim 1, wherein the reinforcement material has a first surface facing the anode plate, a second surface facing the cathode plate, and the method further comprises applying an adhesive to at least one of the first and second surfaces.

3. The method of claim 2, further comprising curing the adhesive.

* * * * *